United States Patent [19]

Klamt

[11] Patent Number: 4,562,527

[45] Date of Patent: Dec. 31, 1985

[54] AUTOCONVERTER WITH IMPROVED CHARGING SWITCH SYSTEM

[75] Inventor: Manfred Klamt, Trostberg, Fed. Rep. of Germany

[73] Assignee: Siemens Aktiengesellschaft, Berlin & Munich, Fed. Rep. of Germany

[21] Appl. No.: 570,003

[22] Filed: Jan. 11, 1984

[30] Foreign Application Priority Data

Jan. 19, 1983 [DE] Fed. Rep. of Germany ....... 3301632

[51] Int. Cl.[4] .............................................. H02M 7/04

[52] U.S. Cl. ...................................... 363/89; 363/124; 323/222; 323/224; 323/266; 315/208; 315/DIG. 7

[58] Field of Search .................................... 363/21-26, 363/37, 86, 89, 124; 323/222, 224, 266; 318/206, 208, 219, DIG. 7

[56] References Cited

U.S. PATENT DOCUMENTS

| | | | |
|---|---|---|---|
| 4,251,752 | 2/1981 | Stolz | 315/208 |
| 4,264,949 | 4/1981 | Simmons et al. | 363/25 |
| 4,481,460 | 11/1984 | Kröning et al. | 323/266 |

OTHER PUBLICATIONS

Mamon, M. et al., "A Resonant Converter with PWM Control", Conference: Intelec 81, May 19-21, 1981.

*Primary Examiner*—Peter S. Wong
*Assistant Examiner*—Anita M. Ault
*Attorney, Agent, or Firm*—Hill, Van Santen, Steadman & Simpson

[57] ABSTRACT

An autoconverter comprises a step-up regulating unit and following inverter so that a charging switch of the step-up regulating unit is synchronously controlled as a function of the voltage at one of the switches of the inverter. With the invention, a particularly simple synchronous control of the charging switch designed as a MOS power transistor is provided.

5 Claims, 1 Drawing Figure

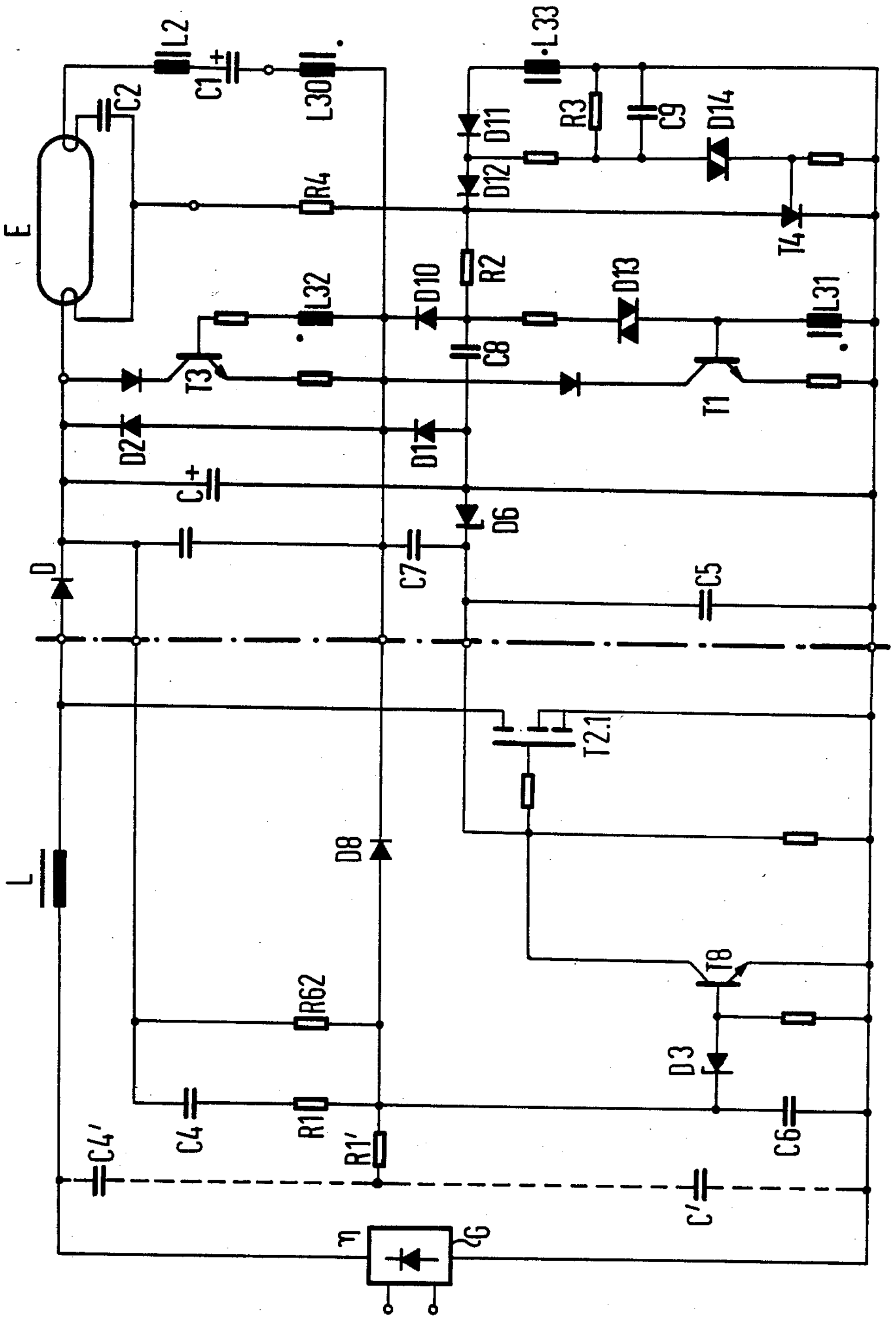
E
L2
C2
C1
L30
L33
R3
C9
D14
D11
D12
R4
T4
R2
D10
L32
D13
L31
C8
T3
T1
D2
D1
C
D6
D
C7
C5
T2.1
L
D8
T8
R62
D3
C4
R1
R1′
C6
C4′
C′
G

AUTOCONVERTER WITH IMPROVED CHARGING SWITCH SYSTEM

BACKGROUND OF THE INVENTION

The invention relates to an autoconverter of the type described in U.S. Pat. No. 4,481,460, issued Nov. 6, 1984. A charging capacitor is connected to a dc source via a charging diode and a charging inductor. A charging switch is periodically closed by a signal from a control means with given pulse-duty factor. The charging switch periodically connects the charging inductor to the dc source. Two series connected alternately driven first and second switches are connected parallel to the charging capacitor. Means are provided for synchronizing the control means for the charging switch by a square wave voltage at the first switch such that the charging switch is closed when the first switch opens and is opened after a time defined by charging of the delay means to a response value. A discharge circuit of the delay means is conducted through the first switch.

The synchronous control of the charging switch dependent on the voltage at one of the switches of the inverter according to the above described circuit has the particular and significant advantage that the operating status of the step-up regulating unit automatically depends on the status of the inverter. When the inverter is shut down, for example given a malfunction of the load connected to it, then the step-up regulating unit is also automatically shut down and energy is no longer pumped into the inverter. On the other hand, the step-up regulating unit starts automatically with start-up of the inverter.

Since the duration of current flow over the charging switch in the above described circuit also depends on the voltage at the charging capacitor, the power supplied by the step-up regulating unit also changes automatically when the output voltage of the inverter is varied in order, for example, to change the lamp power. It thus suffices in order to change the lamp power to perform an operation on the inverter, for example to change its operating frequency or—given a constant operating frequency—to change the drive times of the switches of the inverter.

Finally, the inverter can also be operated with d.c. without any commutation whatsoever, whereby all of the enumerated advantages are retained.

SUMMARY OF THE INVENTION

An object of the invention is to further reduce the expense for components. According to the invention, the charging switch comprises a power MOS transistor having a control lead connected to a controllable switch and also to a capacitor. The capacitor and controllable switch form a series connection connected parallel to the first switch. The controllable switch is driven into a closed position via a threshold element means as a function of a voltage at the delay means.

BRIEF DESCRIPTION OF THE DRAWINGS

The drawing shows a preferred embodiment of the invention.

DESCRIPTION OF THE PREFERRED EMBODIMENT

A full-wave rectifier G is connected at its input side to an a.c. power line (220 volts/50 Hertz) over a filter (not shown). At its output side, it is coupled to a charging capacitor C via a charging inductor L and a charging diode D. The series connection of the two alternately driven transistors of the inverter is connected parallel thereto. The transistor T3 adjacent to the charging diode D is referred to below as the secondary transistor and the other transistor T1 is referred to as the primary transistor. A load branch comprising a series circuit formed of a discharge lamp E, a series oscillating circuit C2, L2, a capacitor C1, and a primary winding L30 of a saturation transformer Tr is connected parallel to the secondary transistor T3 so that the capacitor C2 of the series oscilating circuit lies between the two, pre-heatable electrodes of the discharge lamp E which is directly connected to the charging capacitor C with one of its electrodes.

The saturation transformer Tr exhibits two secondary windings L31, L32 as well as a monitoring winding L33. The secondary windings L31, L32 are connected into the control circuits of the primary and secondary transistor T1, T3 such that these transistors are respectively alternately driven during the magnetization reversal time of the saturation transformer. The saturation transformer is thus dimensioned so that the operating frequency of the inverter determined by the saturation transformer lies somewhat higher than the resonant frequency of the series oscillating circuit. As a consequence, gaps between successive hard drive pulses arise so that a simultaneous conduction of the primary and secondary transistor, and thus a short-circuit of the voltage at the charging capacitor C is impossible. Back current diodes D1, D2 are provided parallel to each transistor for carrying current during the simultaneous inhibiting of both transistors. During the conductive time of the primary transistor T1, the voltage of the charging capacitor C is present on the load branch and leads to the charging of the capacitor C1 with the polarity indicated in the drawing. After T1 has been inhibited, the current flows over the load branch driven by the inductor L2 of the series oscillating circuit, and flows over the back current diode D2 until T3 connects through. The capacitor C1 then discharges over T3 and the load branch until T3 blocks again. Subsequently, the load current continues to flow in the same direction over the charging capacitor C and the block current diode D1 until the renewed conduction of T1.

The step-up regulating unit to the left of the dot-dash line functions with a power MOS transistor T2.1 whose drive is significantly simplified. The control electrode of this transistor is applied via a resistor to a capacitor C5 which, in series with a capacitor C7, forms a voltage divider parallel to the primary transistor T1 of the inverter. This voltage divider, and particularly C7, is dimensioned such that the currrent flowing over C7 given an inhibit of primary transistor T1 and the voltage thereacross suffices in order to quickly charge both C5 as well as the capacitance of the control path of the transistor T2.1 and to thereby drive T2.1. This power transistor remains driven until its control voltage disappears. At the latest, this is the case when the primary transistor T1 is conductive again because the capacitor of the control path of T2.1 then discharges over C7 and T1.

As a rule, however, T2.1 will block earlier when transistor T8, which is parallel to the capacitor C5, is driven and this transistor discharges the capacitor of the control path of T2.1. This is the case when the voltage at a delay capacitor C6 has reached the limit value defined by a Zener diode D3.

The charging of C6 is dependent on the voltage at the charging capacitor C to which the delay capacitor is connected in parallel via a resistor R62. Also lying parallel to this resistor is the series connection of a capacitor C4 and a resistor R1. By so doing, the charging of C6 is also dependent on the a.c. component of the voltage at the charging capacitor C.

The additional charging of C6 via C4 and R1 leads to a shortening of the conducting period of the transistor T2.1 given an increasing amplitude of the half-wave voltage of the rectifier G. This results in an improved sine shape of the main current. Even better results in this regard can be achieved when C6 is not connected a.c. -wise to the charging capacitor C but, rather, over a resistor R1′ to a voltage divider—shown with broken lines—comprising the capacitors C4′ and C′ that lies parallel to the rectifier G. In this case, R1 and C4 are not employed. The charging capacitor C can also be incorporated into this voltage divider. C′ can thus be connected to the positive terminal of C. The expense for the voltage divider is thus reduced. The voltage divider is dimensioned such that it is essentially only activated given double the frequency of the line voltage and essentially represents a short-circuit for higher frequency noise voltages such as generated by the step-up regulating unit itself as well. This is true independently of the type of step-up regulating unit specified in claim 1.

Over a diode D8, the delay capacitor C6 also lies parallel to the primary transistor T1. It is therefore always discharged when T1 is conductive and begins to charge at the instant T1 blocks, i.e. simultaneously with the drive of T2.1 as well.

T2.1 is thus controlled synchronously with the inverter so that its conducting period is dependent on the charge of the delay capacitor.

The inverter and, thus the step-up regulating unit as well only begin to work when the voltage at a starting capacitor C8 has reached a given value so that its energy is switched over a trigger diode D13 to the control path of the primary transistor T1 and this therefore conducts. The starting or ignition capacitor C8 is thus connected over resistors R2, R4 and an electrode of the lamp E to the charging capacitor C and also lies parallel to the switching path of the primary transistor T1 via a diode D10. After the line a.c. has been applied to the rectifier, the charging capacitor C charges via the charging inductor and the charging diode and thus the ignition capacitor also charges until the primary transistor T1 is triggered. Simultaneously, the ignition capacitor is discharged via D10 so that this ignition circuit can no longer engage during the periodic oscillation of the inverter.

Given operation of the autoconverter with a discharge lamp E, shut-down of the autoconverter is insured when the discharge lamp is constantly reluctant to start, i.e. when there are only repeated, unsuccessful starting attempts. A stop thyristor T4 is provided for this purpose and a monitoring winding L33 of the ssaturation transformer Tr is connected parallel to this stop thyristor T4 over diodes D11, D12. The ignition capacitor C8 is connected parallel thereto over R2, nd the stop thyristor T4 receives its holding current via the electrode of the discharge lamp adjacent to the charging capacitor C and via a drop resistor R4.

An RC element R3, C9 is connected parallel to the monitoring winding L33 over the diode D11, said RC element in turn lying parallel to the control path of the stop thyristor T4 via a trigger diode D14. The function and dimensioning of this circuit are based on the fact that the amplitude of the current flowing over the load branch comprising the discharge lamp and acquired by the monitoring winding L33 is significantly higher given an unlit lamp (resonant case) than given a lit lamp (attenuated oscillating circuit). After a number of unsuccessful start attempts a determined by the circuit parameters, C9 has charged to such degree that the stop thyristor T4 triggers via the trigger diode D14 and shorts the monitoring winding L33. The control voltages for the transistors of the inverter thus disappear and operation of the inverter is interrupted. Neither the normal ignition attempts nor the normal lamp current, however, lead to such a shutdown, since the voltage at C9 does not reach the value necessary to drive the trigger diode D14.

The step-up regulating unit is automatically deactiveated with the inverter and reactivated with the start of the inverter because of the synchronous control of the step-up regulating unit dependent on the square wave voltage at the switches of the inverter.

The inverter remains disconnected until the holding current of the stop thyristor T4 is interrupted and this thyristor can therefore switch back into the inhibit condition. For example, the line a.c. can be switched off for this purpose. Quite frequently, however, a shutdown is the result of a faulty lamp that can be replaced without shutting off the line voltage. Since the holding current circuit is conducted over an electrode of the lamp, the holding current is also interrupted when a lamp is replaced so that the autoconverter automatically restarts after a new lamp has been put in place.

Although various minor changes and modifications might be proposed by those skilled in the art, it will be understood that I wish to include within the claims of the patent warranted hereon all such changes and modifications as reasonably come within my contribution to the art.

I claim as my invention:

1. An autoconverter, comprising: a charging capacitor connected to a d.c. source via a charging diode and a charging inductor; a charging switch periodically closed by a signal from a control means with a given pulse-duty factor; the charging switch periodically connecting the charging inductor to the d.c. source; two series connected alternately driven first and second switches connected parallel to the charging capacitor; means for synchronizing the control means for the charging switch by a square wave voltage at the first switch such that the charging switch is closed as a result of a voltage across said first switch when it is inhibited and is opened after a time defined by charging of a delay means to a response valve; a discharge circuit of the delay means being conducted through the first switch; the charging switch comprising a power MOS transistor having a control lead connected to a controllable switch and also to a series capacitor; the series capacitor and controllable switch forming a series connection connected parallel to the first switch; and said controllable switch being driven into a closed position via a threshold element means as a function of a voltage at said delay means.

2. The autoconverter according to claim 1 wherein the delay means comprises a storage capacitor.

3. An autoconverter according to claim 1 wherein the capacitor connected to the control lead of the MOS power transistor is dimensioned such that a sufficiently fast charging of a capacitance associated with the control lead of the MOS transistor is assured.

4. An autoconverter, comprising: a charging capacitor connected to a d.c. source via a charging diode and a charging inductor; a charging switch periodically closed by a signal from a control means with a given pulse-duty factor; the charging switch periodically connecting the charging inductor to the d.c. source, two series connected alternately driven first and second switches connected parallel to the charging capacitor; means for synchronizing the control means for the charging switch by a square wave voltage at the first switch such that the charging switch is closed when said first switch opens and is opened after a time defined by charging of a delay means to a response value; a discharge circuit of the delay means being conducted through the first switch; the charging switch comprising a power MOS transistor having a control lead connected to a controllable switch and also to a series capacitor; the series capacitor and controllable switch forming a series connection connected parallel to the first switch; said controllable switch being driven into a closed position via a threshold element means as a function of a voltage at said delay means; the d.c. source being a rectifier means supplied from an a.c. line which supplies an unsmoothed half-wave voltage, a pulse-duty factor depending on the voltage at the charging capacitor; and for generating a sinusoidal line current dependent on a correction quatity derived from the half-wave voltage of the rectifier means, the delay means being connected in parallel over a resistor to a first capacitor which together with a second capacitor forms a voltage divider that is connected parallel to the rectifier and is dimensioned such that it is substantially active at twice a frequency of an a.c. voltage feeding the rectifier means and represents a shortcircuit for higher frequency noise voltages.

5. An autoconverter according to claim 4 wherein the charging capacitor is part of the voltage divider.

* * * * *